July 22, 1930. J. ZANG Re. 17,746

CUTTING AND FLANGING TOOL AND METHOD OF FLANGING

Original Filed Feb. 18, 1928 2 Sheets-Sheet 1

INVENTOR:
JOSEPH ZANG.
BY Bruce S. Elliott
ATTORNEY.

CUTTING AND FLANGING TOOL AND METHOD OF FLANGING

Original Filed Feb. 18, 1928 2 Sheets-Sheet 2

INVENTOR:
JOSEPH ZANG.
BY Bruce S. Elliott
ATTORNEY.

Reissued July 22, 1930

Re. 17,746

UNITED STATES PATENT OFFICE

JOSEPH ZANG, OF ST. LOUIS, MISSOURI

CUTTING AND FLANGING TOOL AND METHOD OF FLANGING

Original No. 1,713,940, dated May 21, 1929, Serial No. 255,292, filed February 18, 1928. Application for reissue filed March 1, 1930. Serial No. 432,531.

This invention has for its prime object the provision of a novel and efficient tool for cutting a circular aperture in the head of metal drums, such as those used for the shipment of heavy grease or oil, and flanging the edge of such aperture so that a cap may be fitted securely therein, to the end that the interior of the receptacle may be thoroughly cleansed and rendered usuable for the shipment or storage of all manner of liquids, solids or semi-solids.

Figure 1:
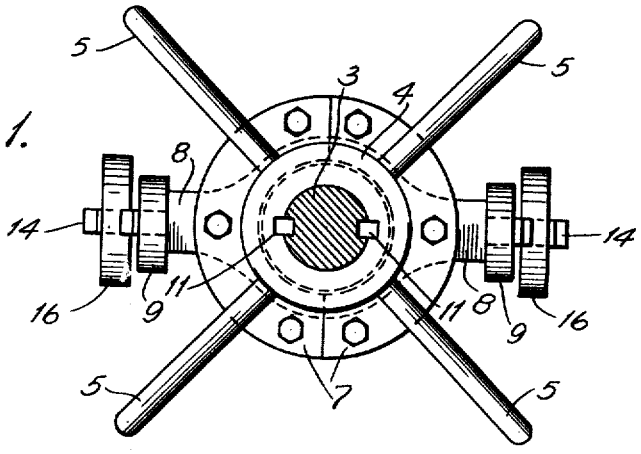
Figure 2:
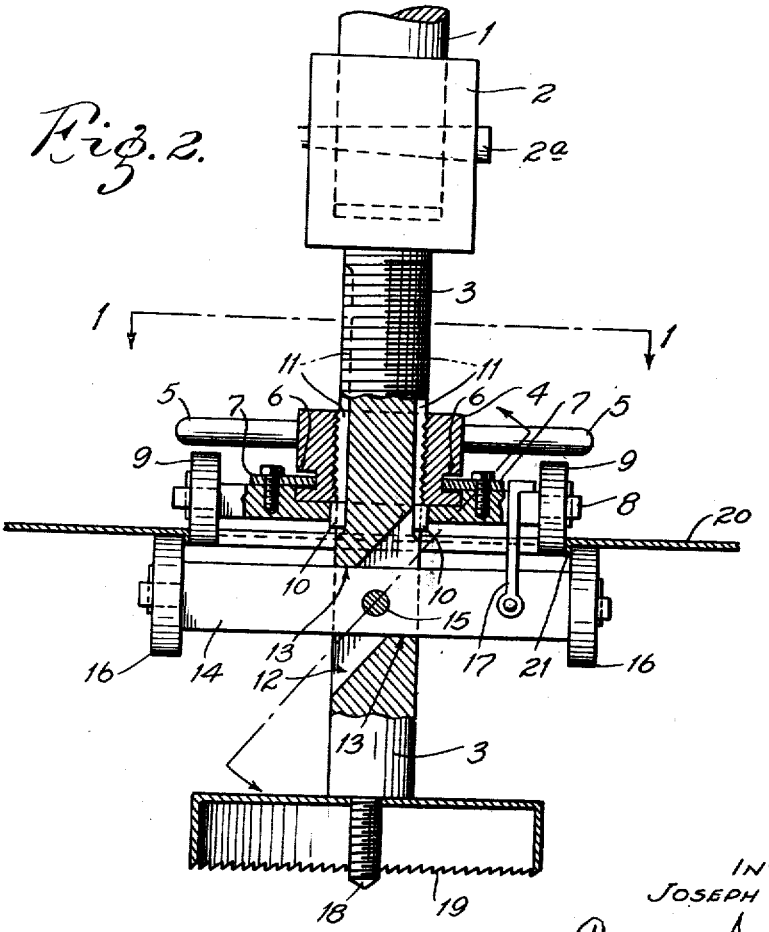
Figure 3:
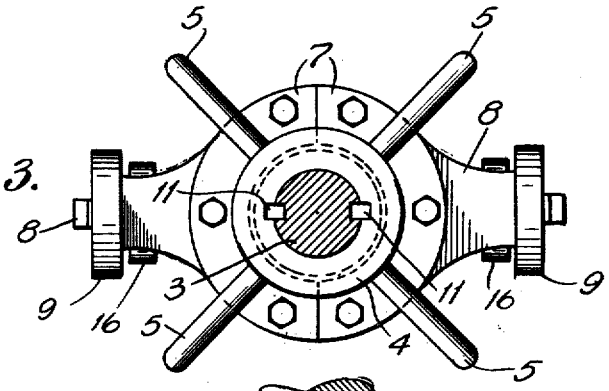

Referring to the said drawing, wherein like numerals refer to like parts throughout the several views, Figure 1 is a top plan view of the tool of my invention; Figure 2 a sectional elevation; Figure 3 an additional top plan view of the tool; and Figure 4 an additional view in elevation differing from Figure 2 in that the parts are shown in full and the position of two elements are changed to illustrate the manner of turning the flange of the drum downward rather than upward.

Figure 4:
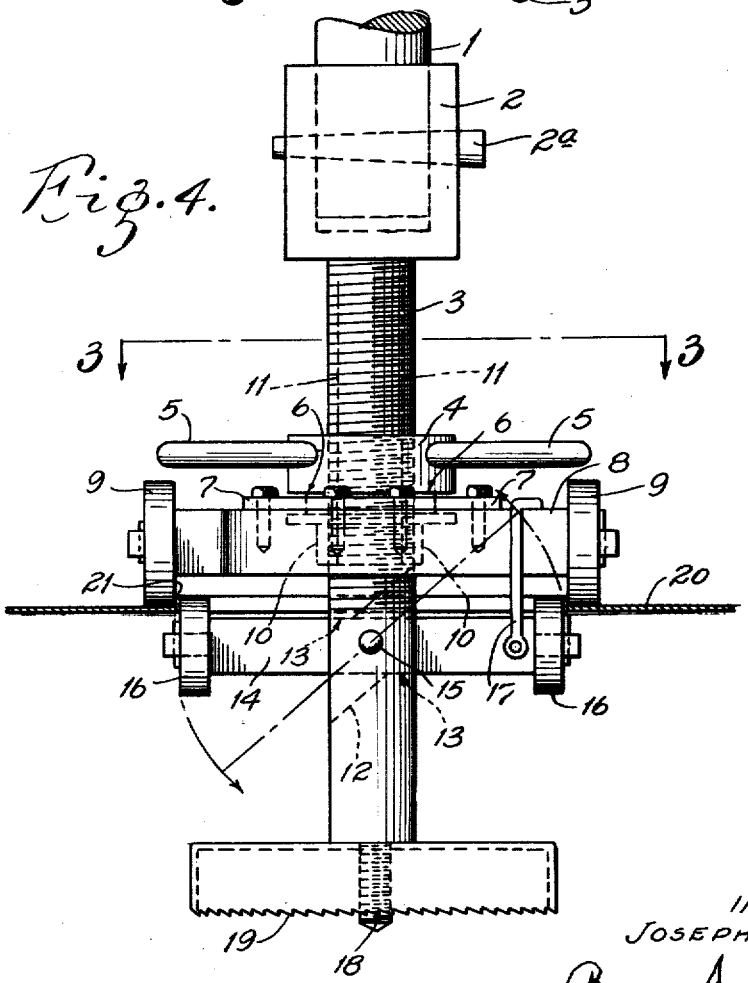

The operation of the tool is, preferably, effected by connection with a drill-press and in Figures 2 and 4 the revolvable shaft of the press is indicated by numeral 1. The lower portion of said shaft projects within a socket or chuck 2 which is apertured for the passage of a coupling $2^a$ and surmounts a spindle 3 projecting through an annular block 4 and threaded for engagement with the threaded bore or said block. The latter may be raised or lowered manually upon said spindle (for the purpose of adjustment of the parts relative to the head of the drum) by turning to right or left the radial spokes or handles 5, and is provided with a circumferential slot 6 for the insertion of a two-part collar 7 which is of less thickness than the width of said slot (so as not to bind the block) and is fastened by screws to an axle 8 carrying rollers 9. Said axle is apertured for the passage of spindle 3 and rotates in unison therewith (when the drill-press is running) by reason of the insertion of keys 10 in key-ways 11 extending lengthwise of the spindle as shown in Figure 2.

At a point beneath the location of axle 8 spindle 3 is provided with a substantially angular recess 12 having shoulders 13 affording stops for retaining in true horizontal position a second axle 14 which is pivotally secured at 15 within said recess and carries a second pair of rollers 16. A lever 17 pivotally secured to axle 14 affords a convenient means for moving the axle upon its pivot to decrease its working width while the tool is being positioned relative to the drum as hereinafter mentioned and, when the parts are in operative position as shown in Figure 2, may be latched over upper axle 8.

The lower extremity of spindle 3 is provided with a drill 18 for centering the incision in the head of the drum which is made by the toothed cutter 19.

In operation, the drill 18 first perforates the head of the drum 20 at its center and thereupon the cutter 19 makes contact with the head and forms an aperture sufficiently large to permit of the thorough cleansing of the interior of the receptacle. Next, axle 14 is tilted within the limits of recess 12 (as indicated by the dotted lines and arrows) and thus projected diagonally through said aperture, whereupon it is brought to horizontal position as shown in Figure 2 by lifting upon lever 17. In such position the rollers carried by axle 14 are brought to bear upon the inner surface of the drum adjacent the edge of the aperture formed by said cutter and by manual rotation of block 4 the rollers carried by axle 8 are then forced downward upon the rim of said aperture. The drill-press then being started and further pressure being at once exerted upon axle 8 by turning spokes 5, the rollers 9 depress said rim and, traversing a circle in unison with the rollers of axle 14, form in conjunction with the latter flange 21 affording a seat for the frictional engagment of a complementary cap or closure (not shown).

If and when it is desired to provide an upturned flange the two axles are simply transposed, as shown in Figure 4, so that the longer axle is uppermost and the rollers of the shorter axle serve to press outward the rim of the aperture formed by the cutter 19.

In addition to the novel tool above described, my invention also involves a novel method of procedure in cutting and flanging the heads of metal drums, as will be set forth in certain of the appended claims.

I claim:

1. A self-contained cutting and flanging tool comprising in combination with means for cutting an aperture in the head of a metallic drum or barrel, mechanism located said cutter and adapted to act against the upper and lower surfaces of the head for flanging the edge of said aperture.

2. A self-contained cutting and flanging tool comprising in combination with means for cutting an aperture in the head of a metallic drum or barrel, mechanism located above said cutter and adapted to act simultaneously against the upper and lower surfaces of the head for flanging the edge of said aperture.

3. A self-contained cutting and flanging tool comprising in combination with means for cutting an aperture in the head of a metallic drum or barrel, a plurality of means one of which is insertible through said aperture adapted to act against the upper and lower surfaces of the head in different planes for flanging the edge of said aperture.

4. In a cutting and flanging tool, in combination with means for cutting an aperture in the head of a metallic drum or barrel, rollers adapted to engage the interior surface of said head adjacent the edge of said aperture, additional rollers adapted to engage the exterior surface of said head in proximity to the position of the first mentioned rollers, means for moving one set of rollers toward the other to grip and bend the edge of said aperture, and means for rotating said rollers in unison to flange said edge.

5. In a cutting and flanging tool, in combination with a rotatable spindle having a cutter mounted on its lower end for cutting a circular aperture in the head of a metallic drum or barrel, a roller operatively mounted on said spindle and adapted to engage the interior surface of said head adjacent the edge of said aperture, a second roller operatively mounted on said spindle and adapted to engage the exterior surface of said head in proximity to the position of the first mentioned roller, and means for moving one of said rollers toward the other to grip and shape the edge of said aperture as said rollers are revolved in the rotation of said spindle.

6. In a cutting and flanging tool, in combination with a rotatable spindle having a cutter mounted on the lower end thereof for cutting a circular aperture in the head of a metallic drum or barrel, an axle pivotally mounted on said spindle and provided at its opposite ends with rollers adapted to engage the interior of the head adjacent the edge of said aperture, a second axle slidably mounted on said spindle to turn therewith and provided at opposite ends with rollers adapted to engage the exterior surface of the head in proximity to the position of said first mentioned rollers, and means for moving one set of said rollers toward the other as the spindle revolves to cause the rollers to grip and shape the edge of said aperture.

7. In a cutting and flanging tool, in combination with a rotatable spindle having a cutter mounted on its lower end for cutting a circular aperture in the head of a metallic drum or barrel, a pair of interchangeable axles mounted on said spindle to rotate therewith and carrying at their outer ends rollers adapted to simultaneously engage, respectively, the interior and exterior surfaces of the head adjacent to the edge of said aperture, one set of rollers being positioned closer to said edge than the other set, and means for moving one of said axles toward the other as the spindle is rotated to cause the rollers to grip and shape the edge of said aperture.

8. In a cutting and flanging tool, in combination with a rotatable spindle having a cutter mounted on the lower end thereof for cutting a circular aperture in the head of a metallic drum or barrel, an axle pivotally mounted on said spindle and having at its opposite ends rollers adapted to engage the interior surface of the head adjacent the edge of said aperture, a second axle slidably mounted on said spindle to turn therewith and having at its opposite ends rollers adapted to engage the exterior surface of the head at points nearer the edge of said aperture than the points of engagement of the first-mentioned rollers, and when rotated by the spindle to travel in a circular path of smaller diameter than the circular path traversed by said first-mentioned rollers, and means for moving said second axle toward the other as the spindle is rotated to cause the rollers to grip and shape the edge of said aperture.

9. In a cutting and flanging tool, in combination with a rotatable spindle having an upper screw threaded portion and a cutter mounted on its lower end for cutting a circular aperture in the head of a metallic drum or barrel, an axle pivotally mounted on said spindle and provided at its opposite ends with rollers adapted to engage the interior of the head adjacent the edge of said aperture, a second axle slidably mounted on said spindle to turn therewith and provided at opposite ends with rollers adapted to engage the exterior surface of the head in proximity to the position of said first mentioned rollers, a member having screw threaded engagement with the threaded portion of said spindle and loosely engaged with said second axle, and means for turning said member to move the upper set of rollers toward the lower as the spindle revolves to cause the rollers to grip and shape the edge of said aperture.

10. A tool of the character described comprising means for cutting an aperture in the head of a metallic drum or barrel, an axle carrying rollers adapted to engage the interior surface of said head adjacent the edge of said aperture, a second axle carrying rollers adapted to engage the exterior surface of said head in proximity to the position of the first-mentioned rollers, means for moving one of said axles toward the other to grip the rim of said aperture between said rollers, and means for rotating said axles in unison to flange said rim.

11. The method which consists of cutting a circular aperture in the head of a metallic drum and thereafter introducing into said aperture a flanging tool and flanging the edge of said aperture by exerting pressure with one part of said tool adjacent the circumferential edge of said aperture on one side of the head and simultaneously producing on the other side of the head with another part of the tool a resistance applied in a circular path beyond the zone of application of said exerted pressure and in coincidence therewith.

12. The method which consists of cutting a circular aperture in the head of a metallic drum and thereafter introducing into said aperture a flanging tool and flanging the edge of said aperture by progressively exerting pressure with one part of said tool adjacent the circumferential edge of said aperture on one side of the head and simultaneously producing on the other side of the head with another part of the tool a resistance applied in a circular path beyond the path of application of said exerted pressure and in coincidence with such application.

13. The method which consists of cutting a circular aperture in the head of a metallic drum, then introducing into said aperture a flanging tool and therewith flanging the edge of said aperture by exerting pressure with one part of the tool adjacent the circumferential edge of said aperture on one side of the head with another part of the tool and producing on the other side of the head a resistance applied beyond the zone of application of said exerted pressure.

14. The method which consists of cutting a circular aperture in the head of a metallic drum, then inserting a flanging tool into the aperture and thereafter flanging therewith the edge of said aperture by exerting a flanging pressure with one part of said tool adjacent the circumferential edge of said aperture on the outer side of the head and producing with the inserted part of the tool on the inner side of the head and within the drum a resistance applied beyond the zone of application of said exerted pressure.

15. The method which consists of cutting a circular aperture in the head of a metallic drum, and in continuance of said operation introducing a flanging tool into the aperture and thereafter flanging therewith the edge of said aperture by exerting a flanging pressure with one part of said tool adjacent the circumferential edge of said aperture on one side of the head and simultaneously producing with another part of the tool on the other side of the head a resistance applied beyond the zone of application of said exerted pressure.

16. The method which consists of cutting a circular aperture in the head of a metallic drum and in continuance of said operation inserting a flanging tool into the aperture and thereafter flanging therewith the edge of said aperture by exerting flanging pressure with one part of said tool adjacent the circumferential edge of said aperture on the outer side of the head and simultaneously producing with the inserted part of the tool on the inner side of the head and within the drum a resistance applied beyond the zone of application of said exerted pressure.

17. The method which consists of cutting a circular aperture in the head of a metallic drum and in continuance of said operation inserting a flanging tool into the aperture and thereafter flanging therewith the edge of said aperture by exerting pressure with one part of said tool adjacent the circumferential edge of said aperture on the outer side of the head and simultaneously producing with the inserted part of the tool on the inner side of the head and within the drum a resistance applied in a circular path beyond the zone of application of said exerted pressure and in coincidence therewith.

18. In combination with a rotatable spindle, a flanging device mounted thereon, a resistance device mounted on said spindle at a distance from the flanging device, means for moving one of said devices toward the other, and means for decreasing at will the working width of one of said devices to permit of its insertion in an aperture, the circumferential edge of which is to be flanged by the cooperative action of said devices.

JOSEPH ZANG.

CERTIFICATE OF CORRECTION.

Reissue Patent No. 17,746. Granted July 22, 1930, to

JOSEPH ZANG.

It is hereby certified that error appears in the printed specification of the above numbered patent requiring correction as follows: Page 2, line 7, claim 1, after the word "located" insert the word above; page 3, lines 44 and 45, claim 13, strike out the words "and producing on the other side of the head" and insert the same to follow "head" in line 43, of same claim; and that the said Letters Patent should be read with these corrections therein that the same may conform to the record of the case in the Patent Office.

Signed and sealed this 26th day of August, A. D. 1930.

M. J. Moore,
Acting Commissioner of Patents.

(Seal)